United States Patent
Abys et al.

(10) Patent No.: US 6,346,222 B1
(45) Date of Patent: Feb. 12, 2002

(54) PROCESS FOR SYNTHESIZING A PALLADIUM REPLENISHER FOR ELECTROPLATING BATHS

(75) Inventors: Joseph Anthony Abys, Warren, NJ (US); Conor Anthony Dullaghan, Louth (IE); Peter Epstein, Manalapan; Joseph John Maisano, Jr., Branchburg, both of NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/323,607

(22) Filed: Jun. 1, 1999

(51) Int. Cl.$^7$ .............................. C01G 55/00; C25D 3/50
(52) U.S. Cl. ...................... 423/22; 423/544; 423/548; 106/1.28; 205/265
(58) Field of Search ................... 423/544, 22, 548; 205/265; 106/1.28

(56) References Cited

U.S. PATENT DOCUMENTS

| | | | |
|---|---|---|---|
| 3,933,602 A | * | 1/1976 | Hewze et al. ............ 204/44 |
| 4,066,517 A | * | 1/1978 | Stevens et al. .......... 204/43 |
| 4,552,628 A | * | 11/1985 | Wilcox et al. .......... 204/47 |
| 4,911,799 A | * | 3/1990 | Abys et al. ........... 204/44.6 |
| 5,024,733 A | * | 6/1991 | Abys et al. ........... 204/44.6 |

OTHER PUBLICATIONS

Blokhin, et al. "The Reactions of Palladium (II) Hydroxide With Ammonium Salts", *Russian Journal of Inorganic Chemistry*, 1989, pp. 877–878, vol. 34 (6).
Rogin, et al. "The Reaction of Dioxalatopalladic Acid With Ammonia In Solution", *Russian Journal of Inorganic Chemistry*, 1990, pp. 675–676, vol. 35 (5).
Mellon, J. W. A Comprehensive Treastise on Inorganic & Theoretical Chemistry, Longmans Green & Co NY NY May 1936, vol. XV, p. 683, 1936.*

* cited by examiner

Primary Examiner—Steven P. Griffin
Assistant Examiner—Timothy C Vanoy
(74) Attorney, Agent, or Firm—Alston & Bird LLP

(57) ABSTRACT

This invention provides a process of making a palladium replenisher comprising a complex of palladium tetraammine sulfate. The process includes distilling a palladium nitrate solution at a temperature maintained at or below about 115° C. Palladium sulfate and ammonium hydroxide are then added to make the palladium tetraamine sulfate replenisher from solution. The replenisher of the invention is used to replenish depleted palladium during palladium electroplating to maintain the palladium concentration in the bath within from about 5 to about 10 weight percent of recommended plating bath levels.

7 Claims, 1 Drawing Sheet

PROCESS FOR SYNTHESIZING A PALLADIUM REPLENISHER FOR ELECTROPLATING BATHS

FIELD OF THE INVENTION

This invention is related to a replenisher for palladium and palladium alloy electroplating baths. More specifically, this invention relates to a novel method for making palladium tetraammine sulfate as a replenisher for palladium and palladium alloy plating solutions.

BACKGROUND OF THE INVENTION

Palladium complexes utilized in conventional palladium and palladium alloy plating chemistries contain by-products of their syntheses such as, for example, chloride and nitrite. These species can, under certain conditions, contaminate plating baths resulting in low efficiencies, fast degradation of organic components, and unstable bath performance. These specific are implicated in the corrosive attack of plating line equipment.

Precipitation of palladium salts has been a method used in the prior art to separate palladium from contaminating compounds. One method of precipitating palladium has been described by Rogin et al. (1990) *Russian Journal of Inorganic Chemistry* 35(5). In this particular method, palladium hydroxide is precipitated. The precipitated palladium hydroxide is reacted with oxalic acid to form an oxalate complex of palladium. The action of concentrated ammonium hydroxide on the palladium oxalate complex produces a complex of tetraammine palladium and palladium oxalate. Another method is described by Blokhin et al. (1989) *Russian Journal of Inorganic Chemistry* 34(6). In this particular method, a cationic palladium complex and palladium tetrachloride anion are reacted together and result in the formation of a so called "pink salt." In both methods, chloride and oxalate ions are produced. These ions are electrochemically active species which adversely affect bath performance in the manner previously described.

Recently, it was discovered that palladium tetraammine sulfate complex that is 35 to 45 weight percent palladium could be a suitable replenisher for palladium ans palladium alloy electroplating baths when added with a sulfate complex of the alloying metal at high temperatures.

There remains a need to optimize bath performance by minimizing bath corrosiveness and prolonging the electroplating bath lifetime, as well as providing a replenishing complex that requires less palladium to produce.

SUMMARY OF THE INVENTION

This invention provides a palladium tetraammine sulfate complex which is from about 35 to about 45 weight percent palladium. For purposes of the present invention, the palladium complex is prepared by precipitating the complex from a supernatant solution and separating the complex from the solution. Because of the process by which the complex is prepared, the palladium sulfate complex contains a negligible amount of impurities (i.e. molecules or atoms that are present in the complex due to the presence of impurity or as by-products of the complex formation). A negligible amount of other moieties is a quantity of impurity that does not adversely affect bath performance. The complex is suitable for use as a replenisher of palladium in palladium electroplating baths. The palladium complex is added to the bath in an amount to maintain the concentration of palladium in the bath within from about 5 to about 10 weight percent of the recommended levels.

The complex of the invention is also suitable for use as a liquid or solid replenisher for palladium alloy electroplating baths when added in conjunction with a sulfate complex of the alloying metal.

In a further embodiment, a novel and more economical process for making the useful palladium complex is disclosed. An amount of palladium metal is provided and activated, preferably by washing with hydrochloric acid. The activated palladium is contacted with an excess of nitric acid to make a palladium nitrate solution. The solution is distilled at a temperature less than or equal to about 115° C. An amount of palladium sulfate is added to the solution along with an amount of ammonium hydroxide. The solution is ultimately treated, for example by filtering, to isolate the product from the supernatant fluid.

The palladium tetraammine sulfate complex is preferably used as a replenisher for a palladium plating solution bath. The complex preferably contains from about 35 to about 45 weight percent of palladium, and the complex is added to the bath to maintain a palladium concentration in the bath of from about 5 to about 10 weight percent of recommended bath levels.

The electroplating process is preferably used to plate a metal or treated non-metal article. The complex is preferably rerpresented by the chemical formula $[Pd(NH_3)_4]SO_4 \cdot xH_2O$, where x is 0 in the non-hydrated form and x is a number from 1 to 6 in the hydrated form.

The foregoing is further exemplified from reading the specification and claims.

DETAILED DESCRIPTION OF THE PREFERRED EMBODIMENTS

Figure 1:
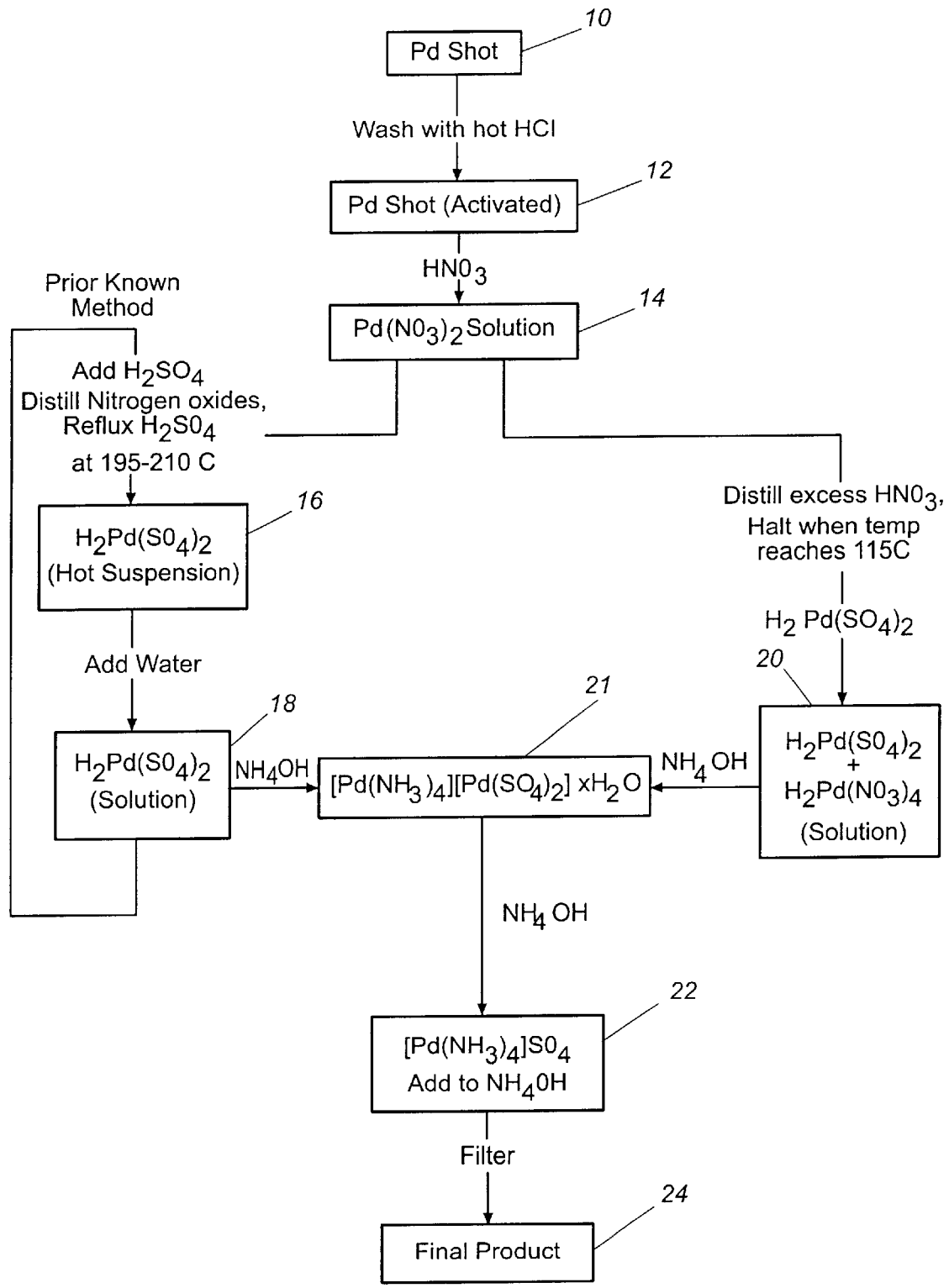
FIG. 1 is a schematic representation of the process of the present invention.

This invention provides a method of forming a complex of palladium suitable for replenishing the palladium in a palladium or palladium alloy electroplating bath. The palladium complex is formed in conjunction with an unreactive counter ion. In one embodiment, sulfate as a counter ion for the palladium complex of the invention is an alternative to the counter ions of the prior art such as oxalate, chloride, nitrate and nitrite counter ions. One of the advantages provided by sulfate counter ions over prior art counter ions is that they are electrochemically inert and cause minimal corrosion and oxidation of the bath components. Another advantage of the use of sulfate as a counter ion in the formation of the complex of the present invention is that the palladium complex is precipitated with a yield of from about 90% to about 95% without contamination by undesirable intermediates and by products.

The process of the present invention provides for the synthesis of palladium tetraammine sulfate. The synthesis can be accomplished by mixing an ammonia-containing aqueous solution and $[Pd(NH_3)_4][Pd(SO_4)_2]$. A complex is formed as a fine pale yellow precipitate, soluble in water, as illustrated by the following chemical equation:

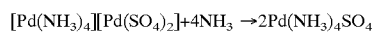

$$[Pd(NH_3)_4][Pd(SO_4)_2] + 4NH_3 \rightarrow 2Pd(NH_3)_4SO_4$$

In one embodiment of the present invention, the palladium complex is produced from $[Pd(NH_3)_4][Pd(SO_4)_2] \cdot xH_2O$. In the nonhydrated form x is 0 and in the hydrated form, x is any number above 0 and up to 6. The structure of the palladium complex was confirmed by elemental analysis. Hydrogen and nitrogen were determined by elemental analysis using the gas fusion technique, sulfate was determined by ion chromatography and palladium was determined by inductively coupled plasma or atomic absorption. Other elemental analyses methods are known to those skilled in the art. The results of the elemental analysis are summarized in Table 1:

TABLE 1

| Element | Pd | N | H | S | O |
|---|---|---|---|---|---|
| Theo. (%) | 44.9 | 11.9 | 2.5 | 13.6 | 27.1 |
| Anal. (%0 | 39.5 | 12.3 | 3.0 | 13.9 | 31.3 |

The preferred complex of the present invention can be used as a solid replenisher to the palladium ion in a palladium or palladium alloy electroplating. Further, the palladium complex can be provided in solution form and added to the bath as a liquid replenisher. Palladium alloys which are contemplated as suitable include, for example, PdCo, PdAg, PdZn, PdFe and PdNi alloys.

A typical palladium electroplating bath contains palladium salt, ammonium chloride, ammonium salts, free ammonium as an ammonia/ammonium buffer system, and organic additives. As the palladium or palladium alloy plates onto a substrate, the concentration of palladium metal and/or alloying metal in the bath decreases. To replenish palladium in the bath and maintain a desired palladium concentration, palladium is added to the electroplating bath during the electroplating process.

The desired palladium concentration for a particular bath is determined by the plating rate and the agitation speed. The palladium concentration is also selected to control dragout losses and minimize palladium waste. The palladium concentration of the bath is generally maintained within 5% to 10% of the desired palladium concentration (g/l). To maintain more stable bath performance, the palladium is replenished frequently. If palladium is not replenished before its concentration drops below within 5% to 10% of the desired concentration, undesirable, rough and dark deposits will likely result, necessitating down time for the plating line while the bath is readjusted. In cases where the replenisher is used to replenish palladium in a palladium/alloy electroplating bath, the corresponding sulfate of the alloying metal can be added in addition to the palladium complex of the present invention.

In the present invention, it was discovered that the amount required of the expensive palladium in the complex could be significantly reduced if the complex synthesis was conducted under stringent operating controls whereby the distillation of the nitrated palladium was restricted to a temperature not to exceed 115° C. To achieve the necessary nitration of the palladium, an excess of nitrate-containing compound was made available during the reaction. The preferred concentration of the nitrate is about 25 g/l. The preferred nitrate is an ammonium nitrate. This manufacturing protocol was in strong contrast to the accepted reflux reaction conducted at from about 195 to 210° C. for from 1–4 hours.

As discussed in the Examples below, the restriction of the distillation temperature coupled with an excess of nitrate, achieved the desired palladium complex end-product with a substantial reduction in the amount of the palladium required.

The term palladium refers to elemental palladium having trace amounts of impurities. The term palladium alloy refers to a compound of palladium combined with an alloying metal such as, for example, cobalt, silver, zinc, iron and nickel. Therefore, the preferred palladium alloys are PdCo, PdAg, PdZn, PdFe and PdNi, where the preferred ratio of palladium:alloy is approximately 50:50 by weight.

Known manufacturing processes for the palladium complex of the present invention using temperatures in excess of 200° C. for from about 1 to 4 hours during a sulfuric acid reflux step also resulted in an increase in nitrates and other impurities in the replenisher mixture, increasing the waste and lowering yield. Such impurities can increase plating bath downtimes, resulting in the stoppage of plating lines and adding to overall production costs. Since the amount of wasted palladium was higher in the known processes, such processes are undesirable and more expensive than the process of the present invention.

According to the process of the present invention, and as shown in FIG. 1, palladium, preferably in the form of palladium shot (10) is preferably washed with HCl to activate the palladium (12). A nitrate is supplied to the activated palladium to produce a palladium nitrate solution (14). In the prior art high temperature process, the palladium nitrate solution was refluxed with a sulfuric acid at a high temperature of from about 195° C. to about 210° C. for from about 1 to about 4 hours to create a hot suspension of palladium sulfate (16). Water was then added to cool the sulfate solution (18) and ammonium hydroxide was added to achieve the final product.

By contrast, according to the present invention, the palladium nitrate solution is distilled carefully by allowing the temperature to rise to a maximum of 115° C. to create the palladium sulfate and palladium nitrate in solution (20). Palladium sulfate and ammonium hydroxide are added to achieve the tetraammine palladium bis(sulfato) palladate (21). A further amount of ammonium hydroxide is added to the intermediate to achieve the palladium tetraammine sulfate product (22). The product is filtered to remove the product from the supernatant fluid to achieve the final product (24).

The plating baths using the replenisher made according to the process of the present invention produced results superior to the replenishers made according to known syntheses. In comparative copper panel plating tests, improvements with respect to plating brightness and color were qualitatively perceived when the replenished baths were used to plate copper panels.

The present invention is described in greater detail in the following non-limiting examples. These examples illustrate the invention as described generally above and are not intended to limit the invention as defined by the claims.

EXAMPLE 1

Comparative Testing—High Temperature Process

A tetraammine palladium sulfate complex replenisher made according to known methods was evaluated for the amount of palladium contained within the complex. The known process used the high temperature (195° C. to 210° C.), reflux process. The complex was assayed for palladium content using Atomic Absorption. The results showed a palladium content of 17.9 g/l palladium.

EXAMPLE 2

High Nitrate-Low Temperature Process

A tetraammine palladium sulfate complex replenisher was made according to the process of the present invention under conditions of excess nitrate and regulated distillation temperature of up to but never exceeding 115° C. The complex was assayed for palladium content using Atomic Absorption.

EXAMPLE 3

Based on the data obtained from Examples 1 and 2, low speed pure palladium plating baths were prepared using the following operating parameters. An amount of 250 ml of baths I (Example I) and II (Example II) were used for bath make-up purposes. The bath compositions are provided in Table 2.

TABLE 2

| Chemical Composition | (I) | (II) |
| --- | --- | --- |
| Pd (as metal) | 8.95 g/l | 8.7 g/l |
| Pallatech CS #5 | 40 g/l | 40 g/l |
| Pallatech CS #6 | 40 g/l | 40 g/l |
| Additive VN | 5 ml/l | 5 ml/l |
| Additive M2C | 5 ml/l | 5 ml/l |

All bath components listed are commercially available from Electroplating Chemicals and Services, Staten Island, N.Y.

The operating conditions used to plate the copper coupons are tabulated below.

TABLE 3

| Parameter | |
| --- | --- |
| Current Density | 10–20 ASF |
| PH | 7.3 |
| Temperature | 40 deg. C. |
| Agitation | 500 rpm |

Both sets of copper coupons exhibited a bright lustrous appearance. Hull cell panels were also plated from both plating baths.

EXAMPLE 4

In this example, 5.1 g of palladium tetraammine sulfate containing 2 g of palladium metal was added to a one liter palladium plating bath to raise the palladium concentration by 2 g/l. The palladium was consumed during plating. The consumption rate of palladium was determined mainly by current density and the time of electrolysis and was calculated using the formula set forth in Example 5. Deposits were plated at current densities of 100, 300 and 500 ASF to a thickness of 50 microinches at 40° C. with moderate agitation. All deposits exhibited a bright appearance, a hardness above 200 $KHN_{50}$, and excellent corrosion resistance as determined by standard salt spray test. This confirms that the palladium complex of the invention is an effective replenisher, and deposits with the foregoing properties would not have been obtained if other counter ions had been introduced in the bath.

EXAMPLE 5

This example illustrates palladium replenishment. For effective replenishment, the palladium concentration of the bath should be maintained within 5% to 10% of the desired value to ensure stable bath performance. By measuring current and time, the AMP-minute (A-min) method is used to calculate the amount of palladium complex that needs to be added to replenish the palladium. The bath is replenished with palladium complex based on the value of A-min consumed as determined by the following formula:

Weight of Palladium Replenisher(grams)=A-min×0.033(%)palladium in salt.

EXAMPLE 6

This example illustrates the replenishment of a PdNi alloy plating bath. A PdNi alloy with 80% palladium/20% nickel (by weight) was deposited on a substrate from the bath containing 20 g/l palladium as metal and 15 g/l nickel as metal. After 2.5 grams of PdNi alloy has been plated (determined by weight) which contained 2 grams (80% by weight) palladium and 0.5 grams (20% by weight) nickel, the PdNi bath needed to be replenished. Replenishment was accomplished by addition of 5.26 grams of the palladium complex of this invention, containing 38% by weight (or 2 grams) of palladium.

This invention and many of its attendant advantages will be understood from the foregoing description, and it will be apparent that various modifications and changes can be made without departing from the spirit and scope of the invention as defined by the claims.

What is claimed is:

1. A process of making palladium tetraammine sulfate comprising the steps of:

providing an amount of palladium;

activating the palladium;

contacting the palladium with a nitrate solution to excess to make a palladium nitrate solution;

distilling the palladium nitrate solution at a temperature below or equal to 115° C.;

adding an amount of palladium sulfate to the palladium nitrate solution; and adding an amount of ammonium hydroxide to the mixture to make palladium tetraammine sulfate.

2. The process of claim 1, wherein the step of activating the palladium comprises washing the palladium with HCl heated to a temperature of from about 40 to about 60° C.

3. The process of claim 1, wherein the nitrate solution is prepared from nitric acid.

4. The process of claim 1, wherein the nitrate is provided at a concentration of from about 15 g/l to about 50 g/l.

5. The process of claim 1, wherein the palladium tetraammine sulfate comprises from about 35 weight percent to about 45 weight percent palladium.

6. A process of making palladium tetraammine sulfate comprising the steps of:

providing an amount of palladium;

activating the palladium;

contacting the palladium with a nitrate solution to excess to make a palladium nitrate solution;

distilling the palladium nitrate solution at a temperature below or equal to 115° C.;

adding an amount of palladium sulfate to the palladium nitrate solution;

adding an amount of ammonium hydroxide to the mixture to make an intermediate palladium compound;

providing an additional amount of ammonium hydroxide to the intermediate palladium compound to make a palladium tetraammine sulfate product; and filtering the palladium tetraammine sulfate product from solution.

7. The process of claim 6, wherein the intermediate palladium compound is tetraammine palladium bis(sulfato) palladate.

* * * * *